L. GOAD, Jr.
SAW GUMMING MACHINE.
APPLICATION FILED SEPT. 24, 1910.
1,015,731.
Patented Jan. 23, 1912.
3 SHEETS—SHEET 1.
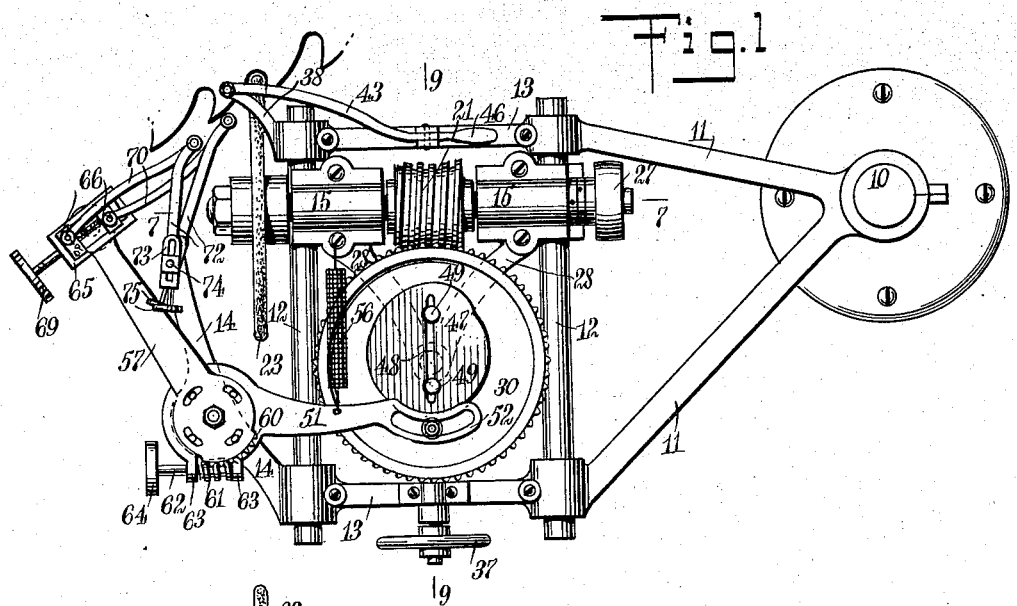
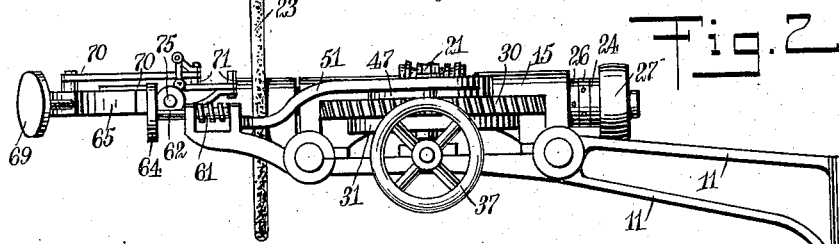
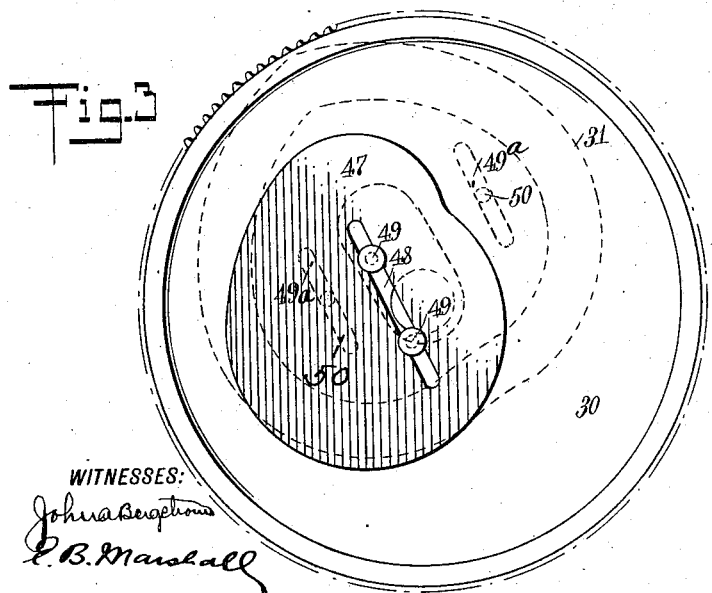
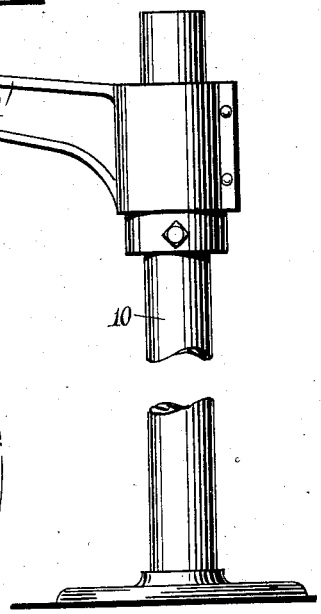
WITNESSES:
INVENTOR
Lawrence Goad Jr
BY
ATTORNEYS

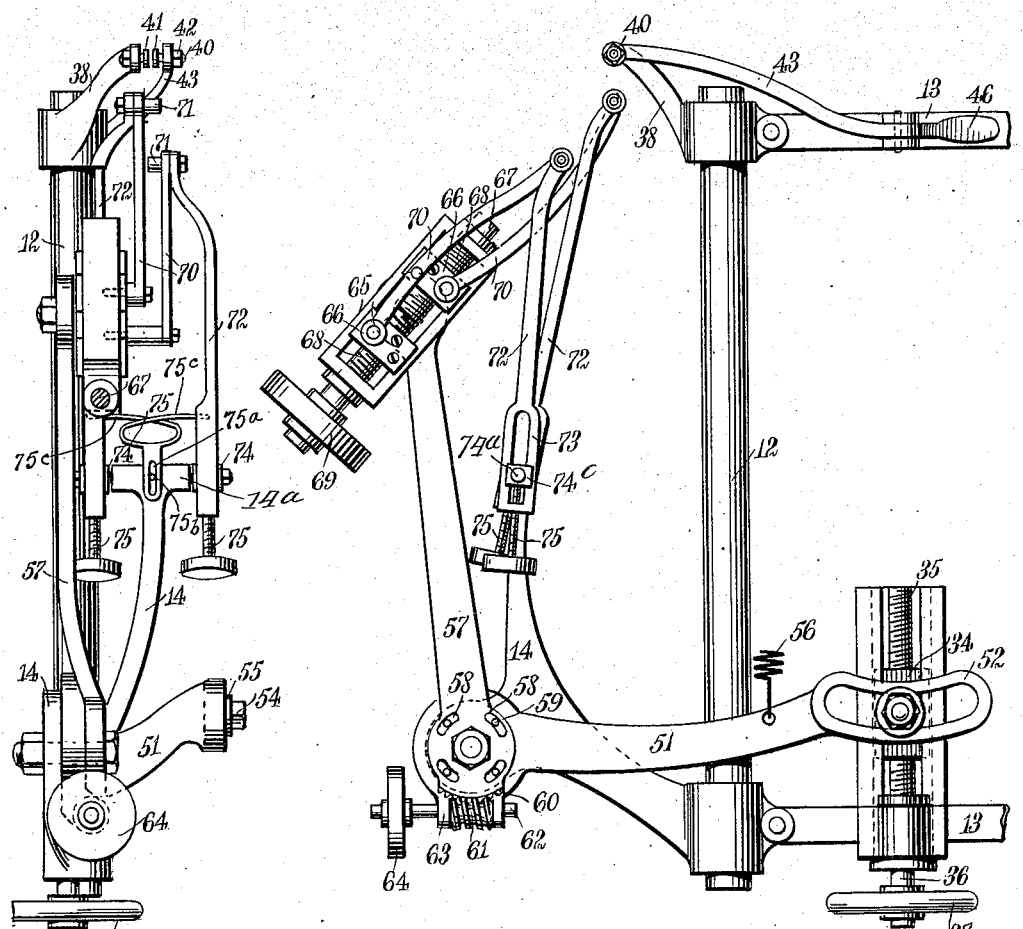
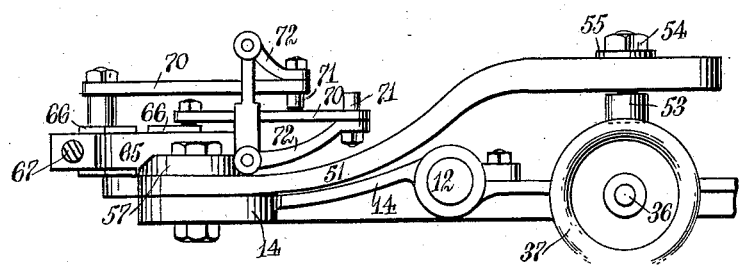

L. GOAD, Jr.
SAW GUMMING MACHINE.
APPLICATION FILED SEPT. 24, 1910.

1,015,731.

Patented Jan. 23, 1912.

3 SHEETS—SHEET 3.

WITNESSES:

INVENTOR
Lawrence Goad Jr
BY
ATTORNEYS

UNITED STATES PATENT OFFICE.

LAWRENCE GOAD, JR., OF ARCATA, CALIFORNIA.

SAW-GUMMING MACHINE.

1,015,731.     Specification of Letters Patent.     Patented Jan. 23, 1912.

Application filed September 24, 1910. Serial No. 583,633.

*To all whom it may concern:*

Be it known that I, LAWRENCE GOAD, Jr., a citizen of the United States, and a resident of Arcata, in the county of Humboldt and State of California, have invented a certain new and Improved Saw-Gumming Machine, of which the following is a full, clear, and exact description.

My invention relates to saw gumming machines and it has for its object to provide one which has feed fingers which automatically advance the saw step by step, so that the emery wheel may be applied between all the teeth respectively.
Additional objects of the invention are to provide means for holding the saw in place relatively to the machine by raising and lowering the emery wheel, and for adjusting the feed fingers to meet all conditions.
Still other objects of the invention will appear in the following complete description, in which the preferred form of my invention is disclosed.

Similar characters of reference indicate similar parts in all the views, in which—

Figure 7:
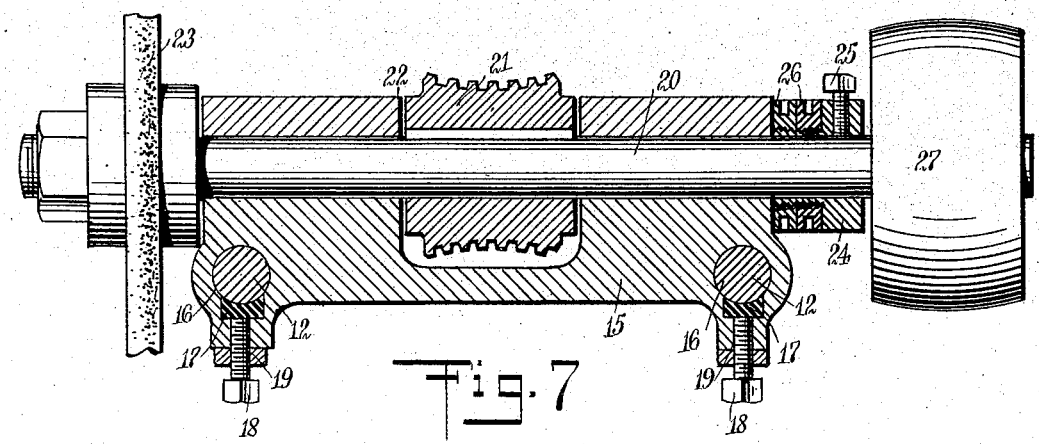
Figure 8:
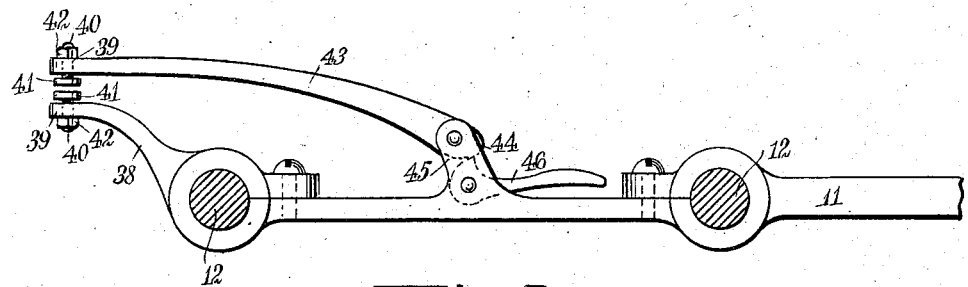
Figure 9:
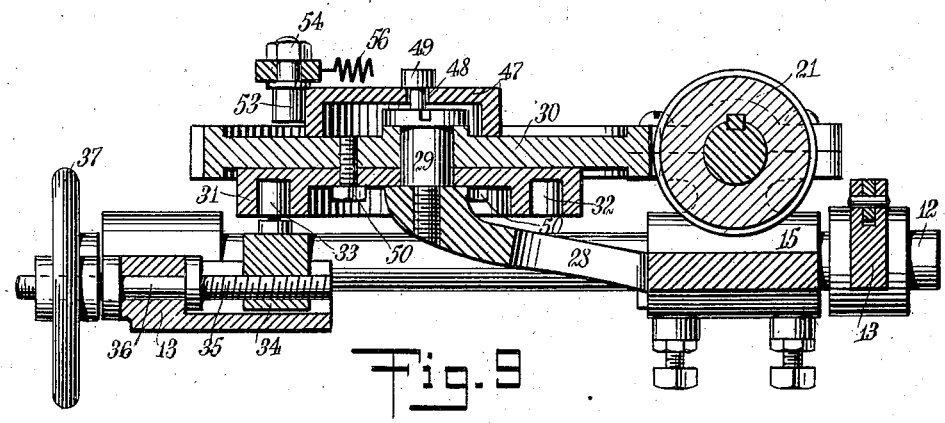
Figure 10:
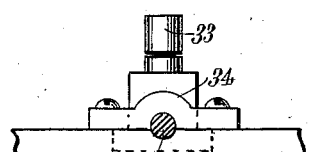

Figure 1 is a plan view of the machine; Fig. 2 is a rear elevation of the machine; Fig. 3 is an enlarged view showing the worm wheel and the cams secured thereto;
Fig. 4 is an enlarged fragmentary view showing the feed mechanism; Fig. 5 is a side elevation of the device shown in Fig. 4; Fig. 6 is an inverted plan view of the structure shown in Fig. 4; Fig. 7 is a sectional view on the line 7—7 of Fig. 1; Fig. 8 is an enlarged fragmentary view showing the arms having members for engaging the sides of the saw; Fig. 9 is a sectional view on the line 9—9 of Fig. 1; and Fig. 10 is a sectional view showing the means for mounting the pin which engages the inner cam member.

By referring to the drawings it will be seen that a standard 10 is provided having arms 11 which are secured to a frame consisting of rods 12, connecting members 13 and an arm 14. A head 15 is provided which has openings 16, in which the rods 12 are disposed, the head 15 being adapted to slide on these rods 12. Adjustable members 17 are provided which are adapted to be disposed against the rods 12, and be adjusted by the screws 18, which mesh in threaded orifices 19 in the bearing member, the function of these members 17 being to make it possible that the head 15 will travel smoothly at all times on the rods and prevent any side play because of the wear of the bearings in the head 15. In the head 15 there is journaled a shaft 20 to which is secured a worm 21, disposed in an opening 22 in the head, an emery wheel 23 being secured to the shaft 20, at one side of the head, a sleeve 24, having an outer thread, being secured to the shaft 20 by means of a screw 25, at the other side of the head. Threaded collars 26 are provided which mesh in the thread of the sleeve 24; this sleeve 24 with the collars 26 serving as a thrust bearing, it being understood that the sleeve and the collars may be adjusted to meet all requirements.

A pulley 27 is secured to the shaft 20. Extending downwardly from the head 15, and secured thereto, there are converging arms 28, a stud 29 being secured to the lower terminals of the arms 28, where they come together. A worm wheel 30 is mounted for rotating on this stud 29, the worm wheel 30 meshing with the worm 21. A lower cam member 31 is secured to the worm wheel 30, this lower cam member 31 having a groove 32, in which a pin 33 travels, this pin 33 being secured to a threaded member 34 in which is disposed a screw 35, secured to a shank 36, which is journaled in a bearing in the lower connecting member 13 of the frame, a wheel 37 being secured to this shank 36 by which means the screw 35 may be readily rotated to move the threaded member 34 relatively to the frame as will be readily understood. An arm 38 is secured to one side of the frame, this arm having a threaded orifice 39 in which a screw 40 is disposed having an inner head 41, a nut 42 being mounted on the screw 40 for locking the screw in position. A companion arm having a cam surface 44, is pivoted to a flange 45 on the upper connecting member 13 of the frame, a cam member 46 being also pivoted to this flange 45, for engaging the cam 44 on the companion arm 43. This companion arm 43 is provided with a screw 40, having a head 41, the screw being disposed in the threaded orifice 39 and the nut 42 being provided for the purpose set forth.

Secured to the worm wheel 30 there is an upper cam member 47, this upper cam member 47 having a slot 48 in which screws 49 are disposed, the screws engaging the threaded orifices in the worm wheel 30, by which means the upper cam member 40 is held in place. As best seen in Fig. 3 of the drawings, the cam member 31 is also provided with slots 49ª, in which screws 50 are disposed, these screws 50 meshing in threaded orifices in the worm wheel 30. Pivoted to the arm 14 there is an arm 51 having a slot 52, in which a pin 53 is disposed, this pin 53 being held in place in the slot 52 by means of a nut 54, which engages a threaded terminal of the said pin 53, the sides of the slot 52 being gripped between a washer 55 and the main body of the pin 53. The arm 51 is connected with the head 15 by means of a spring 56. An arm 57 is pivoted to the arm 14 concentrically with the arm 51, the arm 57 having a plurality of slots 58 in which pins 59 are disposed, these pins 59 being secured to the arm 51. The arm 57 is also provided with a series of teeth 60, which are engaged by a gear member 61 mounted on a shank 62 journaled in bearings 63 secured to the arm 51. The arm 51 is adapted to operate the arm 57 it being understood that the position of the arm 57 relatively to the arm 51 may be adjusted by turning the shank 62 by means of a hand wheel 64. A guide 65 is secured to the arm 57, two threaded members 66 being mounted for traveling in this guide 65. The ends of the guide 65 are provided with bearings in which is disposed a shank 67 having two threaded portions 68 which mesh in the threaded openings in the members 66. One of the threads 68 on the shank 67 is a right-handed thread, while the other thread is a left-handed thread, so that when the shank 67 is turned by the hand wheel 69 the members 66 will be moved to or from each other as may be desired.

Links 70 are articulated to the members 66 respectively, feed fingers 71 being mounted on these links 70. Links 72 are also articulated to the fingers 71, the links 72 having slots 73 in which members 74 are adapted to travel, the members 74 being mounted to rock on pins 74ª secured to the lateral projections 14ª of the arm 14. The ends of the links 72 have threaded orifices in which mesh screws 75 which engage and support the members 74. A spring 75 having a guideway 75ª is provided, a guide 75ᵇ secured to the arm 14, being disposed in this guideway 75ª. The arms 75ᶜ on the spring member are disposed in the slots 73 in the links 72, respectively.

In using the invention the shaft 20 is rotated by means of the pulley 27, which rotates the emery wheel 23, which is disposed between the teeth of the saw, as will be seen by referring to Fig. 1 of the drawings. As the shaft 20 rotates the worm 21 will rotate the worm wheel 30, the worm wheel 30 carrying with it the cam member 31, having the groove 32 in which the pin 33 travels. As the cam member 31 rotates it will be shifted to and fro as the pin 33 travels in the groove 32, the cam member 31 carrying with it the worm wheel 30, and the head 15. It will therefore be seen that as the machine is operated the shaft 20 and the emery wheel 23 will be shifted to and fro periodically so that the emery wheel 23 may be disposed successively between the several teeth of the saw. As the operation of the machine is continued the cam member 47 which engages the pin 53 on the arm 51, will cause the arm 51 to move upwardly and downwardly, this arm 51 operating the arm 57, and the arm 57 moving the links 70 in a manner readily understood. As these links 70 are moved by the arm 57 the feed fingers 71 will engage the teeth to rotate the saw at a time when the emery wheel is lowered out of contact with the teeth.

The arms 38 and 43 are provided for engaging the sides of the saw and making certain that it is in position relatively to the emery wheel and the feed fingers 71. The feed fingers 71 may be disposed at any desired distance from each other by means of the construction described, wherein, by turning the hand wheel 69 the members 66 will be drawn to or from each other, as desired, and as the feed fingers 71 are pivoted to the links 70, they will be moved with the said members 66. In the same manner the links 72 may be adjusted so that the feed fingers 71 may be raised or lowered, and by turning the screws 75 the members 73 will be pushed upwardly or downwardly in the slots 73 of the said links 72.

It will thus be seen that when the machine is operated the emery wheel 23 will be rotated between two of the teeth of the saw, when it will be withdrawn, the arm 51 being operated at the same time to move the arm 57, the arms 51 and 57 forming a pivoted lever, and the feed fingers 71 and their associated parts being operated by the arm 57 of the lever, and engaging the saw teeth to move the saw so that when the emery wheel is again moved forwardly it will be disposed between the next two teeth of the saw.

While my saw gumming machine has been specially devised for use on cylinder saws, it may also be used for gumming saws of other types.

Having thus described my invention, I claim as new and desire to secure by Letters Patent:

1. In a saw gumming machine a frame, a head adapted for moving on the frame, a sharpening member, means by which the sharpening member is carried by the head, two cam members adapted to move relatively to the head, means connected with the head for carrying the cam members, a member on the frame for engaging one of the cam members, a feed finger, and means actuated by the other cam member for operating the feed finger.

2. In a saw gumming machine a frame, a head having a bearing and movable relatively to the frame, a shaft journaled in the bearing, an emery wheel mounted on the shaft, a cam member, gearing by which the shaft is adapted to drive the cam member, a pin for engaging the cam member, and means for supporting the pin on the frame.

3. In a saw gumming machine a frame, a head adapted to travel on the frame and having a bearing, and an arm, a shaft journaled in the bearing, a sharpening member mounted on the shaft, a gear member mounted on the shaft, a gear member meshing with the first-mentioned gear member and mounted for rotating on the arm, a cam member secured to the second-mentioned gear member, a pin for engaging the cam member, and means for supporting the pin on the frame.

4. In a saw gumming machine a frame, a head having a bearing adapted for moving on the frame, a shaft journaled in the bearing in the head, a sharpening member mounted on the shaft, two cam members, means connected with the head for carrying the cam members, means by which the shaft is adapted to drive the cam members, a member on the frame for engaging one of the cam members, a feed finger, and means actuated by the other cam member for operating the feed finger.

5. In a saw gumming machine a frame, a head adapted to travel on the frame and having a bearing and an arm, a shaft journaled in the bearing, a sharpening member mounted on the shaft, a worm mounted on the shaft, a worm wheel meshing with the worm and mounted for rotating on the arm, a cam member secured to the worm wheel, a pin mounted on a block for engaging the cam member, and means for adjusting the block in position relatively to the frame.

6. In a saw gumming machine a frame, a lever pivoted to the frame, a guideway having a bearing mounted on the lever, two threaded members disposed for traveling in the guideway, a screw having a right and a left-hand thread, journaled in the guideway, the threads on the screw meshing with the threaded members respectively, links secured to the threaded members, and feed fingers on the links respectively.

7. In a saw gumming machine a frame, a lever pivoted to the frame, a guideway having a bearing mounted on the lever, two threaded members disposed for traveling in the guideway, a screw having a right and a left-hand thread journaled in the guideway, threads on the screw meshing with the threaded members respectively, links secured to the threaded members, feed fingers on the links respectively, and a spring secured to the lever for holding it yieldingly in a predetermined position.

8. In a saw gumming machine a frame, an arm pivoted to the frame and having a bearing, a second arm pivoted to the frame having teeth, a gear member journaled in the bearing for engaging the teeth, a guide finger, and means for supporting the guide finger on the second-mentioned arm.

9. In a saw gumming machine a frame, an arm pivoted to the frame and having a bearing, a second arm pivoted to the frame having teeth, a gear member journaled in the bearing for engaging the teeth, a guide finger, means for supporting the guide finger on the second-mentioned arm, and a spring for holding the first arm yieldingly in position.

10. In a saw gumming machine a frame, an arm pivoted to the frame and having a pin and a bearing, a second arm pivoted to the frame having teeth and a slot, a gear member journaled in the bearing for engaging the teeth, the pin on the first arm being disposed in the slot on the second arm, a guide finger, and means for supporting the guide finger on the second-mentioned arm.

11. In a saw gumming machine a frame, an arm pivoted to the frame and having a bearing, a second arm pivoted to the frame having teeth, a gear member mounted in the bearing for engaging the teeth, a guideway having a bearing mounted on the second arm, two threaded members disposed for traveling in the guideway, a screw meshing with the threaded members, journaled in the guideway, links secured to the threaded members, and feed fingers mounted on the links respectively.

12. In a saw gumming machine a frame, a lever pivoted to the frame, a guideway having a bearing mounted on the lever, a threaded member disposed for traveling in the guideway, a screw meshing with the threaded member, journaled in the guideway, a feed finger, means connecting the threaded member with the feed finger, and a link articulated to the frame and to the feed finger.

13. In a saw gumming machine a frame, a lever pivoted to the frame, a feed finger, means by which the feed finger is adapted to be operated by the lever, and a link articulated to the feed finger and to the frame.

14. In a saw gumming machine a frame, a lever pivoted to the frame, a feed finger, means by which the feed finger is adapted to be operated by the lever, a link having a slot articulated to the feed finger, and a member disposed for traveling in the slot and supported by the frame.

15. In a saw gumming machine a frame, a lever pivoted to the frame, a feed finger, means by which the feed finger is adapted to be operated by the lever, a link having a slot and a threaded orifice leading to the slot, articulated to the feed finger, a member disposed for traveling in the slot and supported by the frame, and a screw meshing in the threaded orifice in the link for engaging the member.

16. In a saw gumming machine a frame, a lever pivoted to the frame, two feed fingers, means by which the feed fingers are adapted to be operated by the lever, links having slots articulated to the feed fingers, members disposed for traveling in the slots respectively, supported by the frame, and a spring secured to the frame and engaging the links.

17. In a saw gumming machine a frame, a lever pivoted to the frame, two feed fingers, means by which the feed fingers are adapted to be operated by the lever, links having slots and threaded orifices leading to the slots articulated to the feed fingers, members disposed for traveling in the slots respectively, supported by the frame, a spring secured to the frame and engaging the links, and screws disposed in the threaded orifices adapted to engage the members.

18. In a saw gumming machine a frame, a lever pivoted to the frame, a guideway having a bearing mounted on the lever, two threaded members disposed for traveling in the guideway, a screw meshing with the threaded members, journaled in the guideway, links secured to the threaded members, feed fingers mounted on the links respectively, additional links having slots articulated to the feed fingers, and members for traveling in the slots respectively supported by the frame.

19. In a saw gumming machine a frame, a lever pivoted to the frame, a guideway having a bearing mounted on the lever, two threaded members disposed for traveling in the guideway, a screw meshing with the threaded members, journaled in the guideway, links secured to the threaded members, feed fingers mounted on the links respectively, additional links having slots articulated to the feed fingers, members for traveling in the slots respectively supported by the frame, and a spring secured to the frame and engaging the last-mentioned links.

20. In a saw gumming machine a frame, a lever pivoted to the frame, a guideway having a bearing mounted on the lever, two threaded members disposed for traveling in the guideway, a screw meshing with the threaded members, journaled in the guideway, links secured to the threaded members, feed fingers mounted on the links respectively, additional links having slots articulated to the feed fingers, members for traveling in the slots respectively, supported by the frame, and a spring secured to the lever adapted to hold it yieldingly relatively to the frame.

21. In a saw gumming machine a frame, an arm pivoted to the frame and having a bearing, a second arm pivoted to the frame having teeth, a gear member journaled in the bearing for engaging the teeth, two feed fingers, means by which the feed fingers are adapted to be operated by the second-mentioned arm, links having slots articulated to the feed fingers, and members disposed for traveling in the slots respectively, supported by the frame.

22. In a saw gumming machine a frame, a head adapted to travel on the frame having a bearing, a shaft journaled in the bearing, a gear member mounted on the shaft, a gear member meshing with the first-mentioned gear member, and mounted for rotating on the head, two cam members secured to the second-mentioned gear member, a pin for engaging one of the cam members, means for supporting the pin on the frame, a lever pivoted to the frame having a member adapted to be engaged by the other cam member, a feed finger, means for supporting the feed finger on the frame, and means for actuating the feed finger by the lever.

23. In a saw gumming machine a frame, a head adapted to travel on the frame having a bearing, a shaft journaled in the bearing, a gear member mounted on the shaft, a gear member meshing with the first-mentioned gear member, and mounted for rotating on the head, two cam members secured to the second-mentioned gear member, a pin for engaging one of the cam members, means for supporting the pin, a lever pivoted to the frame having a slot, a pin adjustably secured in the slot adapted to be engaged by the other cam member, a feed finger, means for supporting the feed finger on the frame, and means for actuating the feed finger by the lever.

24. In a saw gumming machine a frame, a head adapted to travel on the frame having a bearing, a shaft journaled in the bearing, a gear member mounted on the shaft, a gear member meshing with the first-mentioned gear member and mounted for rotating on the head, two cam members secured to the second-mentioned gear member, a pin for engaging one of the cam members, means for supporting the pin on the frame, a lever pivoted to the frame having a member adapted to be engaged by the other cam member, two feed fingers, means for actuating the feed fingers by the lever, supporting links for the feed fingers, and a spring secured to the frame engaging the supporting links.

25. In a saw gumming machine a frame, a head adapted to travel on the frame having a bearing, a shaft journaled in the bearing, a gear member mounted on the shaft, a gear member meshing with the first-mentioned gear member and mounted for rotating on the head, two cam members secured to the second-mentioned gear member, a pin for engaging one of the cam members, means for supporting the pin on the frame, a lever pivoted to the frame having a member adapted to be engaged by the other cam member, two feed fingers, means for operating the feed fingers adapted to be actuated by the lever, supporting links for the feed fingers having slots, and members traveling in the slots journaled in the frame.

26. In a saw gumming machine a frame, a head adapted to travel on the frame having a bearing, a shaft journaled in the bearing, a gear member mounted on the shaft, a gear member meshing with the first-mentioned gear member and mounted for rotating on the head, two cam members secured to the second-mentioned gear member, a pin for engaging one of the cam members, means for supporting the pin on the frame, a lever pivoted to the frame having a member adapted to be engaged by the other cam member, two feed fingers, means for operating the feed fingers adapted to be actuated by the lever, supporting links for the feed fingers having slots and threaded orifices leading thereto, members traveling in the slots journaled in the frame, and screws meshing in the threaded orifices for engaging the members traveling in the slots.

27. In a saw gumming machine a frame, a head adapted to travel on the frame having a bearing, a shaft journaled in the bearing, a gear member mounted on the shaft, a gear member meshing with the first-mentioned gear member, and mounted for rotating on the head, two cam members secured to the second-mentioned gear member, a pin for engaging one of the cam members, means for supporting the pin on the frame, a lever pivoted to the frame having a member adapted to be engaged by the other cam member, a feed finger, means for supporting the feed finger on the frame, means for actuating the feed finger by the lever, and a spring connecting the head and the lever.

28. In a saw gumming machine a frame, an arm pivoted to the frame and having a bearing, a second arm pivoted to the frame, having teeth, a gear member journaled in the bearing for engaging the teeth, two feed fingers, means by which the feed fingers are adapted to be operated by the second-mentioned arm, links having slots articulated to the feed fingers, and members mounted on the frame, disposed for traveling in the slots respectively.

29. In a saw gumming machine a frame, a lever pivoted to the frame, a feed finger, means by which the feed finger is adapted to be operated by the lever, a link having a slot articulated to the feed finger, a member disposed for traveling in the slot, mounted on the frame, a spring member having a guideway and engaging the slot, and a guide member mounted on the frame for traveling in the guideway.

30. In a saw gumming machine a frame, a lever pivoted to the frame, a guideway having a bearing mounted on the lever, a threaded member disposed for traveling in the guideway, a screw meshing in the threaded member, journaled in the guideway, a link secured to the threaded member, a feed finger mounted on the link, and a second link articulated to the feed finger, and to the frame.

31. In a saw gumming machine a frame, a head having a bearing adapted for moving on the frame, a shaft journaled in the bearing in the head, a sharpening member mounted on the shaft, two cam members, means connected with the head for carrying the cam members, means by which the shaft is adapted to drive the cam members, a member on the frame for engaging one of the cam members, a lever pivoted to the frame, a feed finger, means by which the lever is adapted to operate the feed finger, and means on the lever engaging the other cam.

32. In a saw gumming machine a frame, a head having a bearing adapted for moving on the frame, a shaft journaled in the bearing in the head, a sharpening member mounted on the shaft, two cam members, means connected with the head for carrying the cam members, means by which the shaft is adapted to drive the cam members, a member on the frame for engaging one of the cam members, a lever pivoted to the frame, a feed finger, means by which the lever is adapted to operate the feed finger, means on the lever engaging the other cam, and a link articulated to the feed finger and to the frame.

33. In a saw gumming machine a frame, a head having a bearing adapted for moving on the frame, a shaft journaled in the bearing, a sharpening member mounted on the shaft, two cam members, means connected with the head for carrying the two cam members, means by which the shaft is adapted to drive the cam members, a member on the frame for engaging one of the cam members, an arm pivoted to the frame, and having a bearing, a second arm pivoted to the frame having teeth, a gear member mounted in the last-mentioned bearing, for engaging the teeth, a feed finger, means by which one of the arms is adapted to operate the feed finger, and means on the other arm for engaging the other cam.

34. In a saw gumming machine, a frame, a feed finger, means for operating the feed finger, a link having a slot articulated to the feed finger, a member disposed for traveling in the slot, mounted on the frame, a spring member having a guideway and engaging the slot, and a guide member mounted on the frame for traveling in the guideway.

35. In a saw gumming machine a frame, a feed finger, means for operating the feed finger, a link having a slot, articulated to the feed finger, a member disposed for traveling in the slot, mounted on the frame, and a spring mounted on the frame for engaging the link.

36. In a saw gumming machine a frame, a feed finger, means for operating the feed finger, a link having a slot and a threaded orifice leading thereto, articulated to the feed finger, a member disposed for traveling in the slot, mounted on the frame, a spring mounted on the frame for engaging the link, and a screw member meshing in the threaded orifice, for engaging the first-mentioned member.

In testimony whereof I have signed my name to this specification in the presence of two subscribing witnesses.

LAWRENCE GOAD, Jr.

Witnesses:
JOSEPH E. MOONEY,
GEORGE MARKEN.

Copies of this patent may be obtained for five cents each, by addressing the "Commissioner of Patents, Washington, D. C."